UNITED STATES PATENT OFFICE.

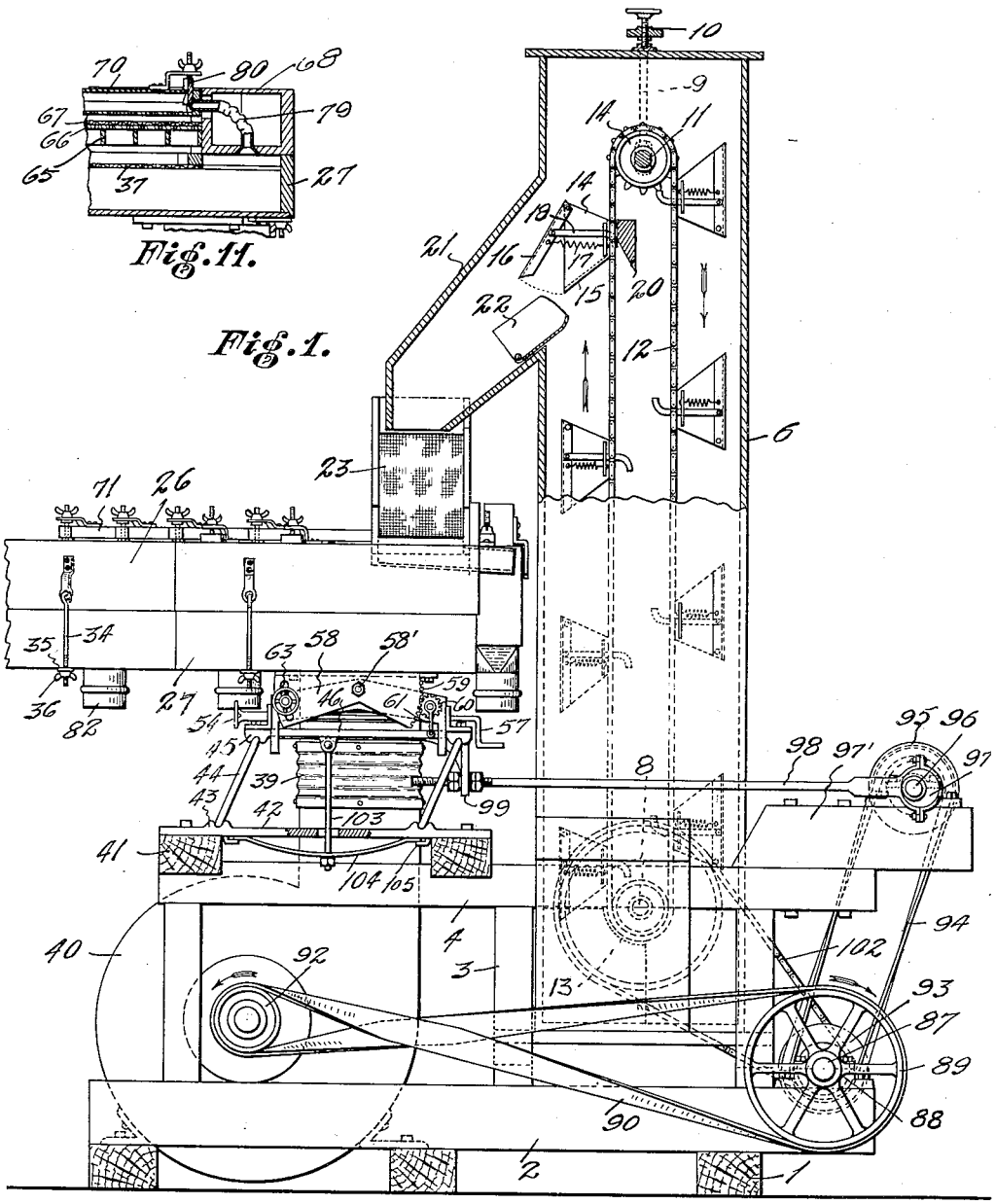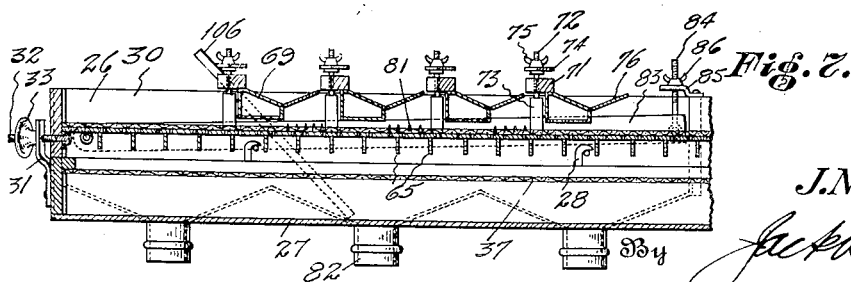

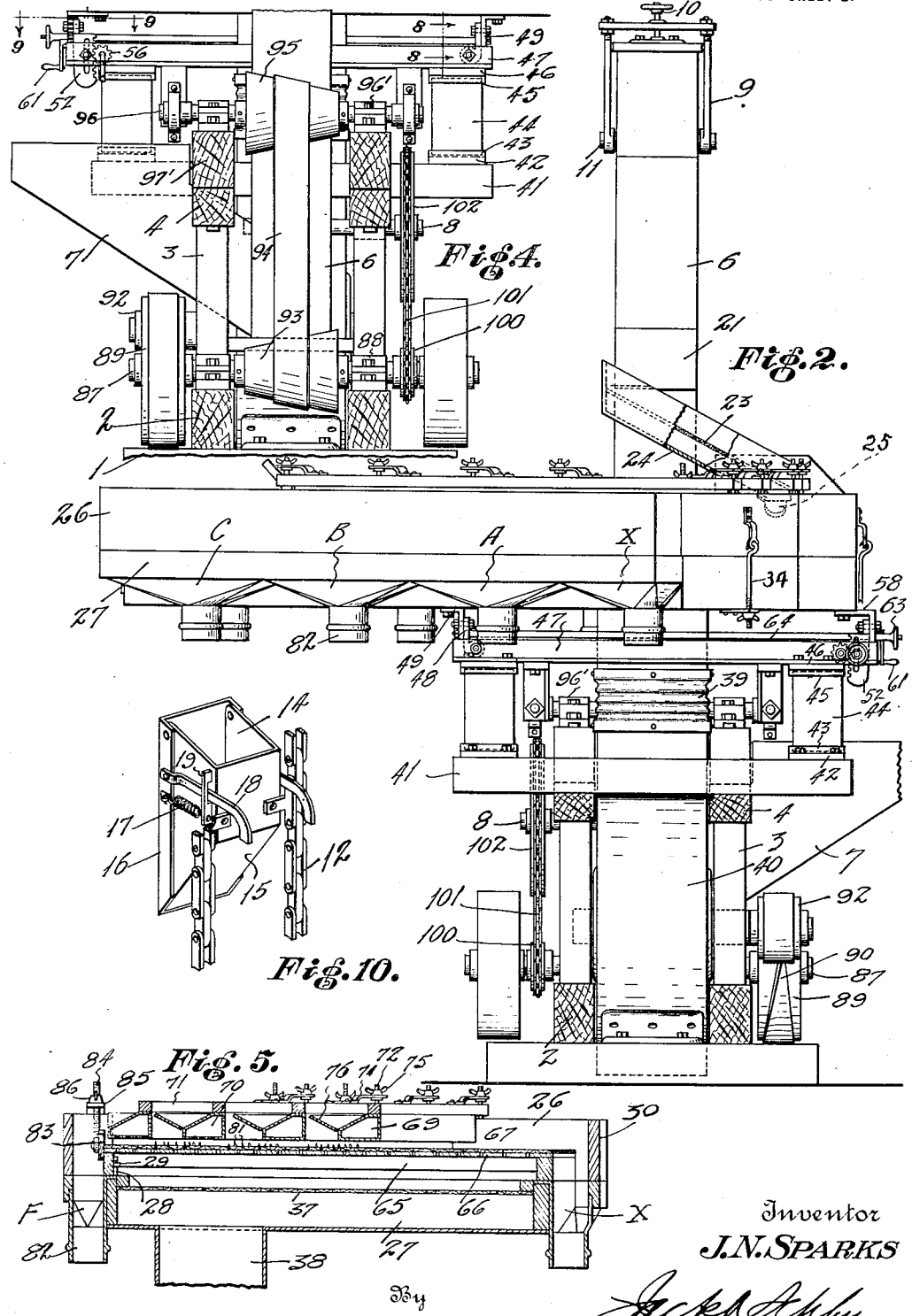

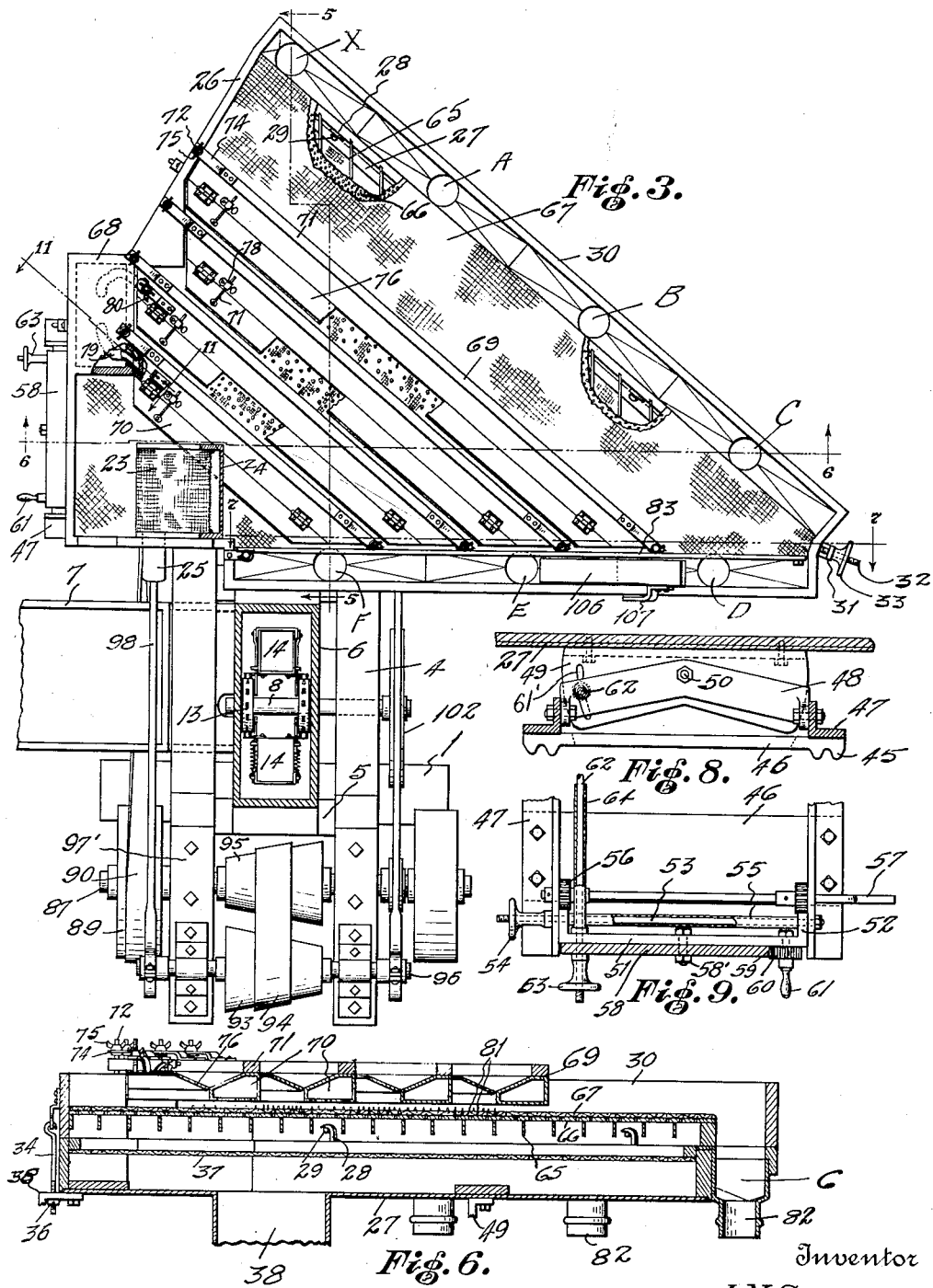

JAMES N. SPARKS, OF DALLAS, TEXAS.

SEPARATING AND GRADING MACHINE.

1,333,944. Specification of Letters Patent. Patented Mar. 16, 1920.

Application filed February 19, 1919. Serial No. 278,092.

*To all whom it may concern:*

Be it known that I, JAMES N. SPARKS, a citizen of the United States, residing at Dallas, in the county of Dallas and State of Texas, have invented certain new and useful Improvements in Separating and Grading Machines, of which the following is a specification.

This invention relates to new and useful improvements in separating and grading machines.

The purpose of the invention is to separate foreign matter from such produce as peanuts whereby the peanuts are cleaned and at the same time to grade the peanuts for the market. It is to be understood that the peanuts are passed through a thresher and a huller before being fed to my machine. The peanuts as received by my machine are mixed with rock and other foreign matter; also some of the nuts or kernels are broken and otherwise inferior, therefore the peanuts must be graded or separated into two or more grades or classes.

In carrying out the invention a machine has been evolved which includes an oscillating deck onto which the peanuts are fed over a primary cleaning screen. The deck may be adjusted to give it the desired inclination whereby the heaviest matter is displaced to the highest side and the lightest matter is carried to the lowest end. The deck is made of foraminous material under which a constant blast of air is delivered which serves to agitate the matter deposited on the deck. Means is also disposed over the deck for directing blasts of air down onto the same. The downwardly directed and upwardly directed blasts of air serve to impede the progress of the lighter matter thus permitting the heavier matter to extricate itself and more readily work to its point of discharge.

The adjustments and details of construction will be hereinafter more particularly pointed out.

The invention will be more readily understood from a reading of the following specification and by reference to the accompanying drawings, in which an example of the invention is shown and wherein:

Figure 1 is a view in elevation of a machine constructed in accordance with this description.

Fig. 2 is an elevation of the machine at right angles to Fig. 1,

Fig. 3 is a plan view.

Fig. 4 is a partial front elevation of the machine,

Fig. 5 is a cross-sectional view on the line 5—5 of Fig. 3,

Fig. 6 is a cross-sectional view on the line 6—6 of Fig. 3,

Fig. 7 is a cross-sectional view on the line 7—7 of Fig. 3,

Fig. 8 is a detail in section on the line 8—8 of Fig. 4,

Fig. 9 is a cross-section of the adjusting means or line 9—9 of Fig. 4, and

Fig. 10 is a detail of one of the elevator buckets.

Fig. 11 is a detail section taken on line 11—11 of Fig. 3.

In the drawings the numeral 1 designates a base composed of suitable timbers and including sills 2 on which posts 3 are mounted for supporting side bars 4 over the sills. Cross-sills 5 extend between the front and middle posts above the sills 2 and support an elevator casing 6 which may be suitably fastened in position. At one side the casing has a receiving hopper 7 at its lower end. A transverse drive shaft 8 is mounted in the lower end of the casing. A take-up yoke 9 depends on each side of the casing at the top and is supported by an adjusting screw 10. A shaft 11 has its end extending through slots in the casing and journaled in the yoke 9.

Sprocket chains 12 travel around sprocket wheels 13 fixed on the shaft 8 and sprocket wheels 14 mounted on the shaft 11. Buckets 14 are fastened to the chains (Fig. 10) and have inclined bottoms 15 and their front sides or doors 16 hinged at their upper ends so that when the front or outer side of a bucket is swung outward the inclined bottom will discharge the contents. Coiled spring 17 attached to the sides of the bucket have their outer ends attached to the fronts or doors 16, normally tending to hold the same closed. The doors are provided with inwardly extending tripping arms 18 supported in keepers 19 at the rear edges of the buckets. The arms project inwardly beyond the chains and have their ends curved downward. A tripping block 20 having a beveled face is supported at the upper portion of the casing 6 in the path of the curved ends of the arms.

The peanuts which have been threshed and hulled are dumped into the hopper so that the buckets fill therewith as they pass around the sprockets 13. The loaded buckets are carried upward by the chains and thus elevated. A spout 21 extends from the rear side of the casing and has a chute 22 pivoted at its upper end and extending into the casing in the path of the upwardly moving buckets. As the buckets move upward they move the upper end of the chute and pass the same so that the upper end of the chute falls under the bottom 15 of each bucket. When a bucket clears the chute its arms 18 ride into engagement with the beveled face of the block 20 whereby the arms are pushed outward and its door 16 is swung open. The peanuts are discharged onto the chute which prevents any from falling down the casing. The peanuts pass down the spout and are discharged onto an inclined cleaning screen 23 at right angles to the spout. Fine foreign matter will pass through this screen onto the bottom 24 from which it passes to a discharge spout 25.

The screen discharges onto the front end or corner of a deck 26 having a general triangular shape in plan. The deck fits on an air chest 27 which is provided with upstanding hooks 28 engaging pins 29 on the inner faces of the side walls 30 of the deck. The side walls of the chest and deck converge toward a reduced end at the right hand end (Fig. 3) of the machine and at this end an off-set bracket 31 secured to the chest overlaps the deck and supports a screw 32 secured to the deck (Fig. 7). A nut 33 threaded on the screw bears against the bracket and serves to displace the deck and draw the pins under the hooks 28. Eye-bolts 34 depend from the deck-sides 30 and engage eye-plates 35 projecting from the bottom of the air chest and also receive wing-nuts 36 which support the plates and the chest.

The air chest (Figs. 5, 6 and 7) has a filter-cloth 37 stretched across its upper portion and the deck may be removed to gain access to this cloth. A collar depends from the chest and connects with a flexible trunk 39. This trunk permits the chest and deck to oscillate and is connected to the discharge nozzle of a blast fan 40 which is mounted between the side bars 4 and sills 2 and supported on the base 1.

Cross supports 41 are mounted on the side bars 4 in rear of the elevator casing. The ends of these supports carry bed-plates 42 having transverse sockets 43 receiving the lower rounded ends of rockets 44 having their upper rounded ends engaging in inverted sockets 45 on the under sides of cap plates 46. There are four rockers and the plates 46 are connected at their ends by cross-angle bars 47, the plates 46 and bars 47 forming a cap frame which is oscillated by the rockers. At the right hand ends of the bars 47 an arch bar 48 is transversely pivoted. An angular bracket 49 is centrally pivoted to the bar 48 on a bolt 50, said bracket being secured to the bottom of the air chest. This mounting permits a swinging movement of the deck by means of the arch bar and a tilting movement at right angles thereto through the agency of the bolt 50.

At the opposite ends of the bars 47 a second arch bar 51 is provided with slotted wings 52 (Figs. 2 and 9) bearing against the inner sides of the bars 47 and confined on a bolt 53 extending from one bar 47 to the other through the slots of the wings. A nut 54 threaded on the bolt bears against the outer side of one of the bars 47 and with the assistance of a sleeve 55 surrounding the bolt 53 between the wings, serves to lock the wings at adjusted elevation. The free edges of the wings are toothed and engaged by pinions 56 on a crank shaft 57 also mounted in the bars 47. An adjusting bracket 58 is centrally pivoted to the arch bar 51 on a bolt 58′. The bracket 58 is also secured to the bottom of the air chest. The bracket 58 has a segmental gear rack 59 at one side meshing with a pinion 60 mounted on the bar 51 and provided with a turning handle 61. A long bolt 62 is supported in the arch bars 48 and 51 and passed through slots 61′ in the brackets 49 and 58 concentric to the bolts 50 and 58′. The bolt has its head against the bracket 49 and receives a nut 63 which bears against the bracket 58. A sleeve 64 mounted on the bolt 62 extends from one arch bar to the other and by tightening the nut 63 the brackets are fastened in tilted positions.

It is obvious that the deck 26 and air chest 27 may be bodily tilted either forwardly or rearwardly by turning the pinion 60 and fastened by the nut 63. The left hand or receiving end of the deck may be elevated as desired, these two adjustments being at right angles to each other. By this arrangement the deck may be tilted at any desired angle and also the left hand side Figs. 3 and 4 raised higher than the left hand side.

The deck includes a plurality of joists 65 extending from front to rear.

A sheet of perforated metal 66 is mounted on the joists and a covering of fine-mesh hardware cloth 67 is laid upon the sheet as is shown in Figs. 3, 5, 6 and 7. Along the right hand side, Fig. 3, of the deck are banking bosses 68. Vertically adjustable separating bars 69 extend diagonally across the deck from the rear banking boss to the front edge of the cloth 67, but are disposed substantially parallel to the rear wall 30 of the deck. Similar blowing bars 70 extend from the front boss in parallel relation to the bars 69. The bars 69 and 70 are hollow and each is pendant from a ridge strip 71. Each ridge strip is adjustable on a vertical bolt 72 at each end, the bolts at one end being mounted on the bosses and carried on posts 73 (Fig. 7) at the opposite end. Each strip has an upwardly bent finger 74 at each end and nuts 75 rotatably confined in the ends of the fingers engage on the bolts. The bolts act as guides for the strips and the fingers support the same.

The bars 69 and 70 are equally spaced and each has a deflector wing 76 hinged to its edge and supported at an upward inclination by pivoted adjusting rods 77 sliding through suitable fasteners. 78. The wings are wide enough to close proximately to the rear sides of the bars in front. The flat under sides of the bars 69 and 70 are disposed horizontally over the deck and their proximity may be controlled by the adjusting nuts 75. The undersides of the bars 70 are perforated and the bars are each connected with a trunk 79 extending through a slot in the front boss. Each bar 70 is provided with cut-off gate 80. The trunks have suitable connection (see Fig. 11) with the air chest.

As before stated an air blast is delivered to the air chest. The blast spreads in the chest and escapes upward through the filtering cloth 37, sheet 66 and covering 67. This upward air current or blast is met under the two front bars 70 by the downwardly directed current of air from said bars. The peanuts together with more or less tailings and foreign matter such as small pieces of rock, etc., are delivered onto the front right hand corner (referring to Fig. 1) of the deck by the inclined screen 23. The deck being oscillated by the rockers 44, the peanuts, etc., will work toward and under the first bar 70 and encounter the opposed air currents.

The currents act as a barrier for the lighter material such as tailings, and the latter is displaced toward the right hand side of the deck; while the heavier matter is displaced toward the rear and higher side of the deck. The separation of the light and heavy materials takes place under the bars 70 and this separation is continued under the bars 69. For assisting in the separation short spurs 81 extend up through the covering 67 from the sheet 66 but are disposed under the bars. The downward air currents are delivered from the bars 70 only and may be controlled by the gates 80. The bars 69 and 70 being close to the deck act as guides or skimmers and tend to guide the lighter material (which will be on top of the mass) toward the right. The wings 76 prevent the air currents blowing the light materials off the deck and may be adjusted according to the volume of said currents.

Along the rear margin of the deck a series of hoppers X, A, B, and C are arranged between the edge of the cover 67 and the rear wall 30; while between the front edge of the covering and the front wall 30 a series of hoppers D, E and F are arranged. These hoppers each have a depending collar 82 through which the contents of the hopper may be discharged into a sack or other receptacle (not shown). The right hand side of the deck being the lowest the heaviest material such as rock and the like will work toward and discharge into the hopper X. The best grade of peanuts will be the heaviest and the poorest grade the lightest consequently the best grade will discharge into the hopper A and the succeeding lighter grades into the hoppers B, C and D respectively. Mixed peanuts and tailings will be guided by the bars 69 and 70 to hopper E; while the light trash and tailings will go into the hopper F. It is to be understood that the deck is continually oscillating and the air blasts escaping upwardly through the covering 67, thus keeping the materials in motion and displacing them according to their weight and grade.

A tailing gate 83 is pivoted at the right hand end of the deck and extends along the front edge of the covering 67 (Fig. 7). The gate terminates at the left hand end of the hopper F where it is adjustably supported by an eye-bolt 84 passing through a bracket 85 projecting from the wall 30. A wing nut on the bolt 84 rests on the bracket thus supporting the gate. By adjusting the gate its upper edge is inclined and will be highest at the hopper F and will pass below deck-edge at the hopper D. The purpose of this gate is to regulate the discharge of tailings and lightweight peanuts, grain, etc. It might here be stated that this machine is not limited to the separation and grading of peanuts as it can be used for grain and other commodities. If there is considerable trash the gate is raised as the light trashy stuff will be on top, but if the commodity is comparatively clean the gate is lowered so that the tailings will readily ride over the gate into the hopper F and the reclaimed materials will be discharged into the hoppers D and E.

The wall 30 extends around the deck and acts as a guard flange to prevent materials being thrown off the deck. The hardware cloth or covering 67 lies flat on the perforated sheet 66 and provides a rough surface for the deck which serves to agitate the materials and prevent them sliding in the wrong direction. The deck will of course be inclined and tilted and rarely level as shown in the drawings, but it is not considered necessary to illustrate such obvious adjustments.

For driving the various parts a main drive shaft 87 is mounted in boxes 88 on the sills 2 and has a pulley 89 which drives the fan pulley 92 by a crossed belt 90. A cone pulley 95 mounted on the shaft 87 drives a reversed cone pulley 95 by a belt 91 and by shifting the belt the speed of the pulley 95 is varied. The pulley 95 is mounted on a shaft 96 carried in boxes 96' on blocks 97' projecting from the forward ends of the said bars 4. The shaft carries eccentrics 97 at each end which drives pitmen 98. Each pitman has its rear end adjustably connected with a hanger 99 fixed to one of the angle bars 47, whereby the cap-plates 46 are rocked on the rockers 44. The rockers are held in position and the cap-plates are resiliently sustained by vertical rods 103 pivoted to the plates and depending through the bed plates 42 to bow-springs 104 to which they are attached. The bow-springs have their ends in keepers 105 on the undersides of the plates 42. By varying the speed of the pulley 95 the speed of reciprocation of the pitman 98 may be varied and the oscillation of the deck accordingly regulated. It is obvious that a more rapid oscillation would be required for some materials.

For driving the elevator shaft 8 a sprocket 100 is mounted on the drive shaft 87 and drives a sprocket chain 101 which drives a larger sprocket 102 on the shaft 8. A cut off board 106 has a hook 107 (Figs. 3 and 7) for engaging the wall 30 and supporting the board at an angle to cut off some of the hoppers according to the position to which it is adjusted.

What I claim is:

1. In a separating and grading machine, an oscillating deck embodying an air chest having a substantially flat perforated table closing the top thereof, means for introducing air under pressure into the air chest, spaced substantially parallel separating bars arranged near and above the table and spaced therefrom, said bars forming guide passages therebetween, said bars having substantially flat lower faces, certain faces of said bars being apertured for the escape of downwardly discharging currents of air, means for feeding air under pressure into certain of the separating bars, deflectors arranged between the separating bars and serving to cover the top of the spaces between the same, and means to feed material to be treated upon the table in advance of the separating bars.

2. In a separating and grading machine, an oscillating deck embodying a perforated table, means for supplying air under pressure beneath the perforated table so that the air discharges upwardly through the perforations, a plurality of hollow bars arranged near and above and spaced from the perforated table, certain of said bars having downwardly discharging apertures, means to supply air under pressure to the apertured hollow bars, and means to feed material to be treated upon the table in advance of said bars.

3. In a separating and grading machine, an oscillating deck embodying a perforated table, means for supplying air under pressure beneath the table so that the air discharges upwardly through the perforations, a plurality of hollow bars arranged above and slightly spaced from the perforated table, said bars being spaced from each other providing passages, certain of said bars having downwardly discharging apertures, means to supply air under pressure to the apertured hollow bars, and means to feed material to be treated upon the table in advance of said bars.

4. In a separating and grading machine, an oscillating deck embodying a perforated table, means to oscillate the table, means for supplying air under pressure beneath the perforated table so that the air discharges upwardly through the perforation, a plurality of separating bars arranged above and slightly spaced from the perforated table in substantially parallel relation thereto, a plurality of hollow blower bars arranged near and above the perforated table and spaced therefrom in substantial parallel relation thereto, said hollow bars having downwardly discharging apertures, all of said bars being spaced from each other for providing passages, means to supply air under pressure to said hollow bars, means to feed material to be treated upon the table in advance of said bars, and hoppers arranged near one edge of the table in proximity to the ends of said passages.

5. In a separating and grading machine, an oscillating deck embodying an air chest having a substantially flat perforated table covering the top thereof, means for introducing air under pressure into the chest, a fabric covering the perforated top, substantially parallel tubular separating bars arranged near and above the table and spaced therefrom, said bars forming guide passages therebetween, said bars having substantially flat lower faces, the faces of certain bars being apertured for the escape of downwardly discharging currents of air, means for feeding air under pressure into the tubular separating bars, which have the apertured faces, upwardly projecting prongs carried by the perforated table and extending through the fabric and arranged beneath the separating bars, means to cover the passages between the bars and means to feed material upon the table in advance of the bars.

6. In a separating and grading machine, a support, an arch bar secured to one end of the support, a second arch bar slidably engaging the opposite end of the support, means to vertically adjust the second arch bar and clamp the same in adjustment at the desired position, an angle bar pivoted to one arch bar, a second angle bar pivoted to the vertically adjustable arch bar, means to angularly adjust one angle bar and lock the same in adjustment, an air chest carried by the angle bars, and a table carried by the air chest.

7. In a separating and grading machine, an oscillating deck having its front and rear sides converging, said deck embodying a perforated table, banking bosses at the divergent side of the deck, an air chest arranged beneath and connected with the perforated table, bars arranged above and near and spaced from the perforated table, certain of the bars being hollow and having downwardly discharging apertures, means for supplying air under pressure to the hollow bars, hoppers arranged near the front and rear edges of the table, and means for oscillating the table.

In testimony whereof I affix my signature.

JAMES N. SPARKS.